United States Patent
Wang et al.

(10) Patent No.: US 12,436,142 B2
(45) Date of Patent: Oct. 7, 2025

(54) METHOD OF PREPARING DEGASSED OIL REPRESENTATIVE OF LIVE OIL WITH EQUIVALENT MINIMUM MISCIBLE PRESSURE

(71) Applicant: Southwest Petroleum University, Chengdu (CN)

(72) Inventors: Shuoshi Wang, Chengdu (CN); Wenhua Zhao, Chengdu (CN); Ping Guo, Chengdu (CN); Zhouhua Wang, Chengdu (CN); Jianfen Du, Chengdu (CN); Yisheng Hu, Chengdu (CN); Huang Liu, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 408 days.

(21) Appl. No.: 18/130,924

(22) Filed: Apr. 5, 2023

(65) Prior Publication Data
US 2023/0366869 A1    Nov. 16, 2023

(30) Foreign Application Priority Data
May 10, 2022  (CN) .......................... 202210508931.7

(51) Int. Cl.
*G01N 33/28*   (2006.01)
(52) U.S. Cl.
CPC .................................. *G01N 33/28* (2013.01)
(58) Field of Classification Search
CPC ....................................................... G01N 33/28
USPC ............................................................ 436/8
See application file for complete search history.

(56) References Cited

U.S. PATENT DOCUMENTS

| | | | |
|---|---|---|---|
| 5,711,373 A * | 1/1998 | Lange ...................... | C09K 8/58 166/402 |
| 2013/0197809 A1* | 8/2013 | Jones ...................... | G01N 1/00 73/864.91 |
| 2015/0144535 A1* | 5/2015 | Contreras Carvallo ..................... | C10G 29/22 208/263 |

(Continued)

FOREIGN PATENT DOCUMENTS

CN         101609624 B      5/2011

OTHER PUBLICATIONS

Burnett, D. A. et al., Permian Basin Oil and Gas Recovery Conference 1981, SPE 9710, 15 pages. (Year: 1981).*

(Continued)

*Primary Examiner* — Arlen Soderquist
(74) *Attorney, Agent, or Firm* — Bayramoglu Law Offices LLC

(57) ABSTRACT

A Hydrophilic-Lipophilic Deviation theory-based method is provided to prepare representative degassed oil with equivalent minimum miscible pressure to live oil. The method can reduce the number of trial and error type experiments during the representative degassed oil preparation process by measuring the MMP and EACN for dead and live oil. The representative degassed oil formulation could be easily predicted after determining the required MMP and EACN values. The prepared oil can reflect the key mechanism of multiple contact miscible mechanism in the process of gas flooding more accurately. It allows experiments that are inconvenient to use live oil to consider the mechanism of multiple contact miscibility easily.

3 Claims, 2 Drawing Sheets

(56) References Cited

U.S. PATENT DOCUMENTS

2015/0330962 A1* 11/2015 Aquino Olivos ...... G01N 33/28
                                                                                                   436/147
2019/0225870 A1* 7/2019 Johns ...................... G06F 30/20

OTHER PUBLICATIONS

Puerto, M. C. et al., Society of Petroleum Engineers Journal 1983, 23, 669-682. (Year: 1983).*
Goodlett, G. O. et al., SPE Rocky Mountain Regional Meeting 1983, SPE 15172, 28 pages. (Year: 1986).*
Emera, M. K. et al., Journal of Canadian Petroleum Technology 2008, 47, 52-61. (Year: 2008).*
Liyanage, P. J. et al., SPE Improved Oil Recovery Symposium 2012, SPE 154274, 17 pages. (Year: 2012).*
Jang, S. H. et al., SPE Improved Oil Recovery Symposium 2014, SPE 169169-MS, 14 pages. (Year: 2014).*
Ghosh, S. et al., SPE Annual Technical Conference and Exhibition 2014, SPE-170927-MS, 35 pages. (Year: 2014).*
Lu, J. et al., Journal of Petroleum Science and Engineering 2014, 124, 122-131. (Year: 2014).*
Veedu, F. K. et al., SPE Reservoir Simulation Symposium 2015, SPE-173255-MS, 19 pages. (Year: 2015).*
Jin L. et al., Journal of Petroleum Science and Engineering 2015, 136, 68-77. (Year: 2015).*
Ghosh, S. et al., SPE Journal 2016, 1106-1125. (Year: 2016).*
Creton, B. et al., Oil & Gas Science and Technology—Rev. IFP Energies nouvelles 2016, 71, paper 62, 10 pages. (Year: 2016).*
Rommerskirchen, R. et al., SPE Improved Oil Recovery Conference 2018, SPE-190288-MS, 12 pages. (Year: 2018).*
Chang, L. et al., Fuel 2019, 237, 494-514. (Year: 2019).*
Al-Muraryi, M. T. et al., SPE Middle East Oil and Gas Show and Conference 2019, SPE-195039-MS, 19 pages. (Year: 2019).*
Creton, B. et al., Oil & Gas Science and Technology—Rev. IFP Energies nouvelles 2019, 74, paper 30, 11 pages. (Year: 2019).*
Sui, X. et al., Fuel, 2020, 262, paper 116647, 9 pages. (Year: 2020).*
Al Hamad, M. et al., Journal of Petroleum Science and Engineering 197, paper 108000, 9 pages. (Year: 2021).*
Park, J. et al., SPE Improved Oil Recovery Conference 2022, SPE-209427-MS, 13 pages. (Year: 2022).*
GB/T 28912-2012, Test method for two phase relative permeability in rock, China National Standards, 2012, pp. 1-22.
Xiang Dan, et al., Application of plexiglass to study the microscopic distribution of remaining oil in water flooding, Petroleum and Gas Chemicals, 2005, pp. 293-295, vol. 34, No. 4.
Olawale Adekunle, et al., Experimental and analytical methods to determine minimum miscibility pressure (MMP) for Bakken formation crude oil, Journal of Petroleum Science and Engineering, 2016, pp. 170-182, vol. 146.
SY/T 6573-2016, Measurement method for minimum miscibility pressure by slim tube test, China National Standards, 2016, pp. 1-13.
Yu Liu, et al., Estimation of minimum miscibility Ppessure (MMP) of $CO_2$, and liquid n-alkane systems using an Improved MRI technique, Magnetic Resonance Imaging, 2016, pp. 97-104, vol. 34.
Jean-Louis Salager, et al., How to Attain Ultralow Interfacial Tension and Three-Phase Behavior with Surfactant Formulation for Enhanced Oil Recovery: A Review. Part 4: Robustness of the Optimum Formulation Zone Through the Insensibility to Some Variables and the Occurrence of Complex Artifacts, Journal of Surfactants and Detergents, 2017, pp. 987-1018, vol. 20.

* cited by examiner

METHOD OF PREPARING DEGASSED OIL REPRESENTATIVE OF LIVE OIL WITH EQUIVALENT MINIMUM MISCIBLE PRESSURE

CROSS REFERENCE TO THE RELATED APPLICATIONS

This application is based upon and claims priority to Chinese Patent Application No. 202210508931.7, filed on May 10, 2022, the entire contents of which are incorporated herein by reference.

TECHNICAL FIELD

The invention relates to oil and gas field development engineering, particularly to a preparation method of representative degassed oil.

BACKGROUND

The core experiment is a basic method in the research of oil exploitation technology, which is widely used to evaluate the oil displacement efficiency of various working fluids in water injection, gas injection, chemical flooding, and other technologies under different conditions. In unconventional reservoir development experiments, cores are usually pressurized and saturated by target fluids. Due to the ultra-low permeability of unconventional cores, the flowthrough type of the core saturation could not meet the requirement of the saturation process. Therefore, most experimental oils are dead oils obtained directly from production wells or prepared degassed artificial oils. Due to the degassing problem of live oil caused by the pressure drop of the rock sample saturated with live oil during the sample transfer process, there is no available technique to use live oil in shale core-related experiments.

The existing artificial oil preparation methods mainly consider that the viscosity or density of artificial oil under experimental conditions is similar to that of live oil under underground conditions. For example, the experimental oil in 'A method for determination of relative permeability of two-phase fluids in GB/T 28912-2012 rock' is a refined oil or simulated oil with good compatibility with crude oil based on the actual oil-water viscosity ratio at reservoir condition. The invention named 'A method for preparing simulated oil for indoor oil displacement experiment and its application' (CN101609624B) is to add a base oil with lower viscosity to another base oil with higher viscosity and then add a small amount of tackifier to it for mixing to prepare a simulated oil with consistent viscosity. There are also scholars using $CHCl_3$ and $C_5H_8O_2$ as a simulated oil (Xiang Dan, Huang Dazhi. Application of organic glass to study the microscopic distribution of water flooding remaining oil [J]. Petroleum and Natural Gas Chemicals, 2005, 34 (4): 3). The viscosity and density of the simulated oil are similar to those of crude oil. The above existing artificial oil preparation methods focus on similar viscosity and density. Those artificial oils represent the effects of viscous force and gravity in the experiments. However, they cannot reflect the critical mechanism of contact miscibility in the gas flooding process. So the experimental results are not representative of the physical process under reservoir conditions with gas injection. There are available methods to prepare recombined oil with MMP similar to live oil (Adekunle, Olawale, and B. Todd Hoffman. Experimental and analytical methods to determine minimum miscibility pressure (MMP) for Bakken formation crude oil [J]. Journal of Petroleum Science and Engineering, 2016, 146:170-182). However, the recombined oil still has gas. Some experiments that required degassed oil could not use recombined oil with dissolved gas, e.g., shale core involved experiments.

Due to the complexity of crude oil composition, the minimum miscibility pressure calculated by numerical simulation directly based on the hydrocarbon composition (saturates and aromatics) has an error with the actual value. The minimum miscibility pressure is usually determined by a slim tube experiment. If we tried to prepare a degassed oil sample with minimum miscibility pressure similar to live oil, each degassed oil sample formula needs a full-scale slim tube test. And this trial-and-error style sample preparation method might adjust the sample composition multiple times to find out the correct composition. The cost for multiple slim tube tests is not acceptable for a sample preparation step in the laboratory. Therefore, it is very important to establish a rapid and low-cost representative crude oil preparation method.

SUMMARY

The invention aims to provide a preparation method of representative degassed crude oil with equivalent minimum miscible pressure (MMP) based on HLD (Hydrophilic-Lipophilic Deviation) theory. The HLD theory is used for the thermodynamic description according to the hydrophilic and lipophilic deviation of surfactants, and the characteristic parameters of the surfactant microemulsion system form a linear equation. The equation is predictive and can play a good prediction effect on both ionic and non-ionic surfactant microemulsion systems. The invention mainly characterizes the microemulsion system of the surfactant and crude oil involved through the characteristic parameters in the HLD equation and tests and designs through the standard phase behavior salinity scanning experiment. This invention is able to prepare a degassed oil with a similar minimum miscibility pressure to the live oil. The minimum miscibility pressure is the critical parameter of any gas multiple contact process involved IOR (improved oil recovery) process. This invention prepared degassed oil can represent the actual physical process under reservoir conditions in the gas-involved experiments, leading to more realistic results. It allows experiments that are inconvenient e.g., shale core-related experiments, to use live oil to consider the mechanism of multiple contact miscibility. Compared to the trial and error type of sample preparation, the invention has low cost and complexity and requires much less number of slim tube tests than the trial and error method.

This invention adopts the following technical solution for the above technical purposes.

Firstly, obtain the relationship between minimum miscibility pressure and average carbon number ($C_n$) and the relationship between average carbon number and equivalent carbon number (EACN). And then, based on the HLD method, calculate the equivalent carbon number according to the optimal salinity (S*), and determine the amount of liquid light hydrocarbons added according to the change of the equivalent carbon number before and after degassing, thereby preparing the equivalent minimum miscibility pressure representative degassed oil.

A preparation method of representative degassed oil with equivalent minimum miscible pressure includes the following steps in turn:

(1) The minimum miscible pressures of the live oil and its corresponding degassed oil measured by SY/T 6573-

2016 slim tube method at room temperature are $MMP_1$ and $MMP_2$, respectively. Since the minimum miscibility pressure and the average carbon number $C_n$, the average carbon number $C_n$ and the equivalent carbon number EACN have the following relationship (Yu Liu, Jiang Lanlan, Song Yongchen, et al. Estimation of minimum miscibility pressure (MMP) of $CO_2$, and liquid n-alkane systems using an improved MRI technique [J]. Magnetic Resonance Imaging, 2016):

$$MMP=0.203C_n+4.543 \quad (1)$$

$$EACN=h \times C_n \quad (2)$$

Where h is the empirical coefficient, $C_n$ is the average carbon number, EACN is the equivalent carbon number;

The average carbon number of the live oil and the degassed oil can be calculated to be $C_{n1}$ and $C_{n2}$, respectively, according to formula (1). Assuming that h is 1, the equivalent carbon numbers $EACN_1$ and $EACN_2$ could be calculated by the formula (2).

(2) According to the HLD method, the equivalent carbon number EACN and the optimal salinity S* satisfy the following formula (Jean-Louis Salager, Antón Raquel-E, Arandia Maria-A, et al. How to Attain Ultralow Interfacial Tension and Three-Phase Behavior with Surfactant Formulation for Enhanced Oil Recovery: A Review. Part 4: Robustness of the Optimum Formulation Zone Through the Insensibility to Some Variables and the Occurrence of Complex Artifacts [J]. Journal of Surfactants and Detergents, 2017, 20 (5): 987-1018):

$$\ln(S^*)=K \times EACN+\alpha_T \times \Delta T-Cc+f(A) \quad (3)$$

Where K and Cc are the characteristic parameters of surfactant, $\alpha_T$ is the temperature coefficient of optimal salinity, $\Delta T$ is the difference between temperature and room temperature, f(A) is a function of alcohol-related properties;

Since the temperature change at room temperature is small and alcohol or cosolvent is used in this invention, the values of $\Delta T$ and f(A) are negligible. Therefore formula (3) can be changed into the following form:

$$\ln(S^*)=K \times EACN-Cc \quad (4)$$

Since the K and Cc of the surfactant are known, the salinity corresponding to Winsor Type III of the live oil and the degassed oil microemulsion system (i.e., the four-component system which contains oil, water, salt, and surfactant) is calculated by substituting the calculated $EACN_1$ and $EACN_2$ into Formula (4), that is, the optimal salinity is $S_1^*$ and $S_2^*$ respectively;

(3) Scan the salinity of the degassed oil microemulsion system, and the optimal salinity of the degassed oil is measured to be $S_2^{*'}$. According to Formula (4), the equivalent carbon number $EACN_2'$ of the degassed oil after correction is obtained, and the value of the empirical coefficient h can be calculated according to Formula (2) to obtain the equivalent carbon number $EACN_1'$ of the live oil after correction.

(4) The amount of liquid light hydrocarbons required to reduce the $EACN_2'$ of the degassed oil to $EACN_1'$ are estimated by linear mixing. The process is as follows:

$$[n_1/(n_1+n_2)] \times EACN_2' + [n_2/(n_1+n_2)] \times EACN_{light\ hydrocarbon}=EACN_1' \quad (5)$$

In the formula, $n_1$ is the amount of substance corresponding to the degassed oil, which can be calculated according to mass and molar mass, $n_2$ is the amount of substance corresponding to the liquid light hydrocarbons to be added, and $EACN_{light\ hydrocarbon}$ is the effective carbon number of light hydrocarbon. Because other parameters are known, the amount of liquid light hydrocarbons to be added can be calculated according to Formula (5).

(5) Add an estimated amount of liquid light hydrocarbons into the degassed oil and stir until it is fully mixed. The optimal salinity $S_2^{*''}$ of the compound degassed oil added with liquid light hydrocarbons are measured again by salinity scanning, and the $EACN_2''$ according to the optimal salinity $S_2^{*''}$ of the compound degassed oil is calculated by Formula (4) at this time.

(6) If the $EACN_2''$ of the compound degassed oil is consistent with the $EACN_1'$ of the live oil, it indicates that the representative degassed oil with the same minimum miscible pressure has been obtained;

If the $EACN_2''$ of the compound degassed oil is greater than the $EACN_1'$ of the live oil, the liquid light hydrocarbons are added for fine adjustment with the step length of 1% (volume percentage) of the degassed oil volume until the representative degassed oil with the same minimum miscibility pressure is obtained.

If the $EACN_2''$ of the compound degassed oil is smaller than the $EACN_1'$ of the live oil, the degassed oil is added for fine-tuning with a step length of 1% (volume percentage) of the degassed oil volume until the representative degassed oil with the same minimum miscibility pressure is obtained.

The surfactant of the invention is APES, AES, or APS. APES is Sodium Fatty Alcohol Polyoxypropylene Polyoxyethylene Sulfate ($C_n(PO_4)_n(EO)_nSO_4Na$), AES is Sodium Fatty Alcohol Polyoxyethylene Sulfate ($C_n(EO)_nSO_4Na$), APS is Sodium Fatty Alcohol Polyoxypropylene Sulfate ($C_n(PO_4)_nSO_4Na$).

The liquid light hydrocarbons described in this invention are all kinds of alkanes with low molecular weight and an equivalent carbon number less than the equivalent carbon number of degassing live oil, such as pentane, hexane, heptane, or corresponding homologue.

Compared with the existing technology, the invention has the following beneficial effects:

(1) Without repeated trial-and-error and slim tube experiments, it can be prepared with live oil equivalent minimum miscibility pressure representative degassed oil, and the experiment time is short at a lower cost, it can be completed by only requiring two slim tube experiments;

(2) This kind of degassed oil can more accurately reflect the key mechanism of multiple contact miscible process during the gas flooding than viscosity/density similar degassed oil. The experimental results represent the physical process of gas injection under reservoir conditions in a better way.

(3) The raw materials of the invention are simple and easy to obtain; all of them are commercially available industrial products; the preparation process is simple and easy; the experimental conditions are mild and environmentally friendly and are suitable for indoor displacement experiments of petroleum exploitation teaching and scientific research.

BRIEF DESCRIPTION OF THE DRAWINGS

In FIG. 2: 1—sample container; 2—constant temperature box; 3—motor; 4—rotation shaft; 5—magnetic stirring device; 6—salinity scan device; 7—vacuum degassing device; 8—light hydrocarbon sample container; 9—displacement pump; 10,11,12—valves.

DETAILED DESCRIPTION OF THE EMBODIMENTS

This invention is illustrated in the following according to the attached figures so that the technical personnel in the technical field can understand the invention. But it should be noted that the invention is not limited to the scope of the embodiment. For ordinary technical personnel in this technical field, any changes are protected as long as it is made within the spirit and scope of the invention determined by the attached claims.

These changes are protected in the spirit and scope of the invention as defined and determined by the attached claims.

A preparation method of representative degassed oil with equivalent minimum miscible pressure based on the HLD method includes:

(1) At 30° C., the minimum miscibility pressure of 500 mL live oil in total volume measured by slim tube experiment is $MMP_1=7.08$ MPa, and that of the degassed oil is $MMP_2=7.16$ MPa;

(2) The equivalent carbon numbers of live oil and degassed oil are calculated to be $EACN_1=12.5$ and $EACN_2=12.9$ by taking $MMP_1$ and $MMP_2$ into Formula (1) and formula (2).

Figure 1:
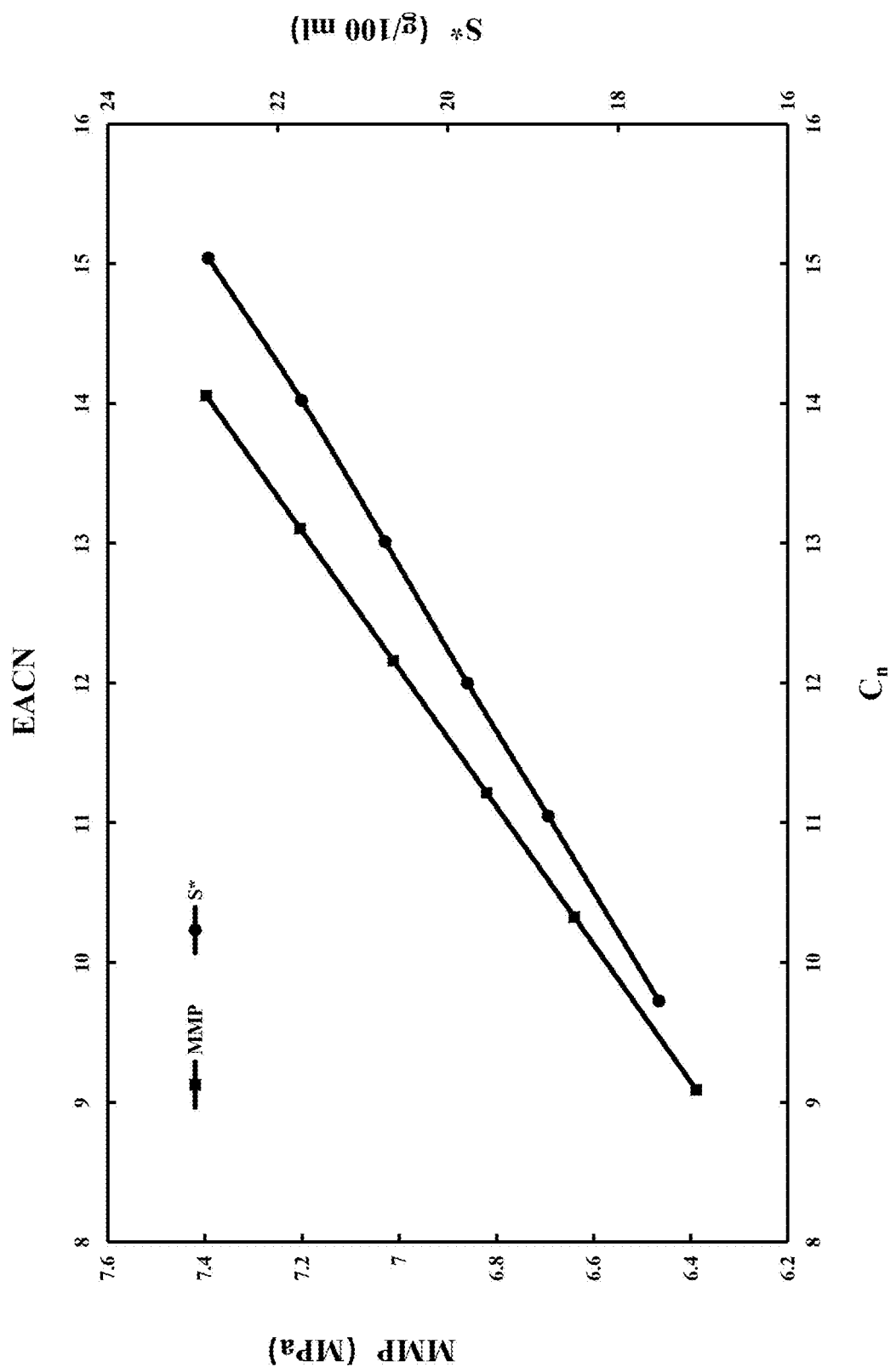
FIG. 1 is the relationship between $C_n$ and MMP, EACN, and S*.
Figure 2:
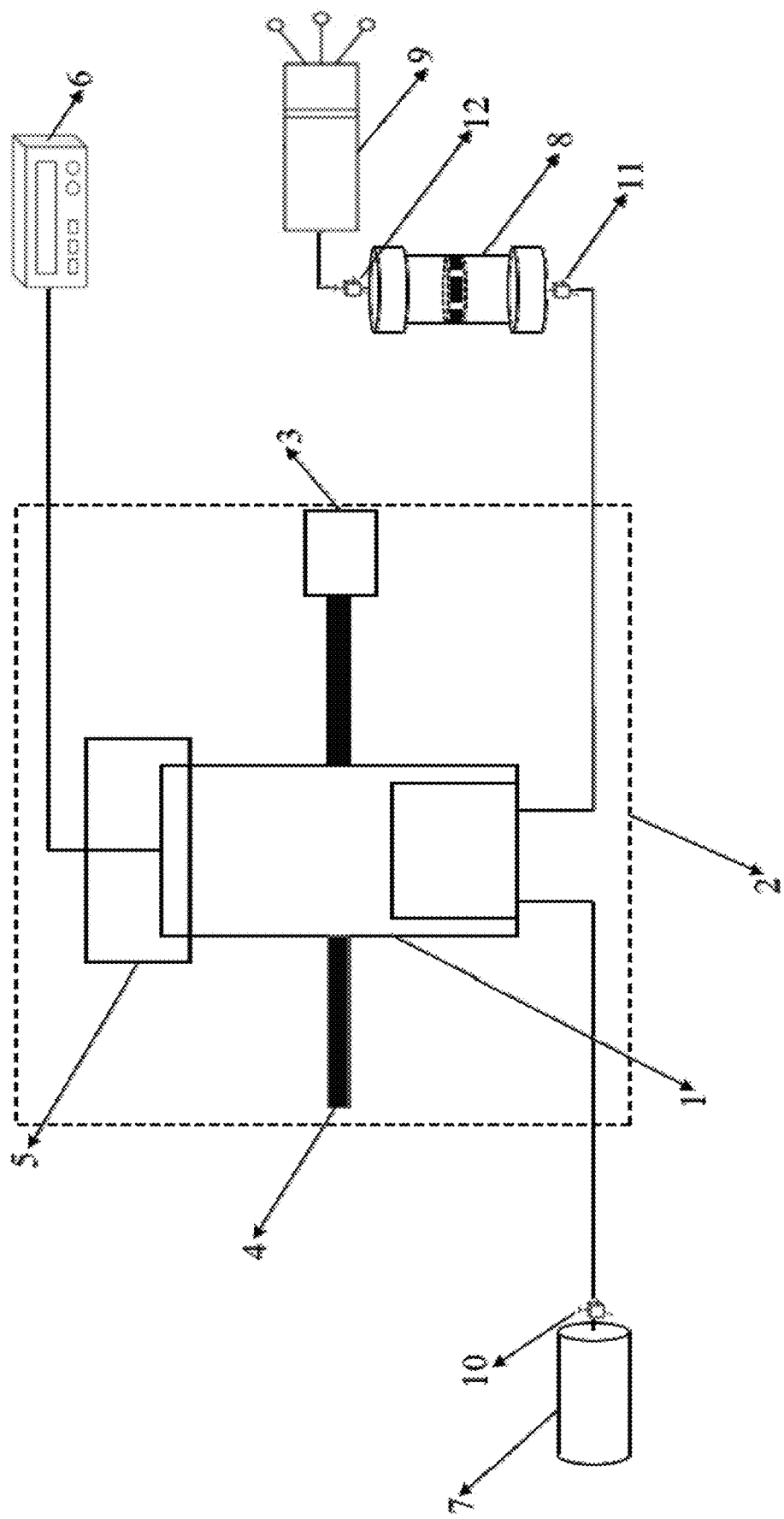
FIG. 2 is a schematic diagram of the device structure for preparing the representative degassed oil.

(3) Use the known surfactant APES (8-41S)($C_8(PO_4)_4(EO)SO_4Na$), the characteristic parameters K=0.0478, Cc=−2.4075, take $EACN_1=12.5$ and $EACN_2=12.9$ into the formula (4), the salinity corresponding to the optimal system of live oil and degassed oil calculated are $S_1^*=20.19$ g/100 mL and $S_2^*=20.59$ g/100 mL (FIG. 1 represents the relationship between Cn and MMP and the relationship between EACN and S*);

(4) Put the degassed oil into sample container 1, start constant temperature box 2, and adjust the temperature to 30° C. (see FIG. 2)

(5) The optimal salinity of degassed oil is $S_2^{*'}=19.8$ g/100 mL.

(6) Substitute $S_2^{*'}=19.8$ g/100 mL into Formula (4), the corrected equivalent carbon number EACN of degassed oil is calculated as $EACN_2'=12.1$, and Formula (2) is established in parallel, and the empirical coefficient h=1.07 is calculated.

(7) Substitute h=1.07 into Formula (2), the equivalent carbon number $EACN_1'=11.7$ after live oil correction is calculated. According to the mass and molar mass of the degassed oil, $n_1=2.8$ is calculated, taking $n_1=2.8$, $EACN_2'=12.1$, $EACN_1'=11.7$, $EACN_{light\ hydrocarbon}=5$ into formula (5), $n_2-0.17$ is calculated. According to the molar mass and density of n-pentane, the volume of liquid light hydrocarbon n-pentane needed when the $EACN_2'$ of the degassed oil reduces to the $EACN_1'$ of the live oil is 19.4 mL.

(8) Start the displacement pump 9, and open valve 11, and valve 12, so that the volume of 19.4 mL of n-pentane can flow into sample container 1.

(9) When the volume of fluid in container 1 increases by 19.4 mL, valve 11 is closed and motor 3 is opened so that the rotation shaft 4 can drive the sample container 1 to rotate. At the same time, the magnetic stirring device 5 is opened so that the added light hydrocarbons are thoroughly mixed with the degassed oil. After 0.5 h, motor 3 and the magnetic stirring device 5 are closed and kept still for 10 min. The optimal salinity of the mixing system in sample container 1 measured by the salinity scanning phase behavior experiment is 19.43 g/100 mL, and the corresponding equivalent carbon number is 11.7, which is equal to the corrected equivalent carbon number of crude oil. At this time, the sample in sample container 1 is a representative degassed oil with a minimum miscible pressure of 7.08 MPa, and the liquid light hydrocarbon required is 19.4 mL.

What is claimed is:

1. A preparation method of a representative degassed oil with an equivalent minimum miscible pressure, comprising the following steps in turn:

(1) measuring minimum miscible pressures of a live oil and a degassed oil corresponding to the live oil as $MMP_1$ and $MMP_2$ respectively, wherein a relationship between a minimum miscible pressure (MMP) and an average carbon number $C_n$, and a relationship between the average carbon number $C_n$ and an equivalent carbon number EACN are expressed as follows:

$$MMP=0.203C_n+4.543 \quad (1)$$

$$EACN=h \times C_n \quad (2)$$

wherein h is an empirical coefficient, assuming that his 1, average carbon numbers of the live oil and the degassed oil are calculated to be $C_{n1}$ and $C_{n2}$ respectively, and equivalent carbon numbers of the live oil and the degassed oil are $EACN_1$ and $EACN_2$ respectively;

(2) allowing the equivalent carbon number EACN and a salinity S* to satisfy the following formula:

$$\ln(S^*)=K \times EACN-Cc \quad (4)$$

wherein K and Cc are characteristic parameters of a surfactant, and substituting $EACN_1$ and $EACN_2$ into Formula (4), salinities of the live oil and the degassed oil are calculated to be S1* and S2* respectively;

(3) scanning a salinity of a degassed oil microemulsion system, wherein a measured salinity of the degassed oil is measured to be $S_2^{*'}$, wherein according to Formula (4), an equivalent carbon number $EACN_2'$ of the degassed oil after a correction is obtained, and a value of the empirical coefficient h is calculated according to Formula (2) to obtain an equivalent carbon number $EACN_1'$ of the live oil after the correction;

(4) calculating an amount of liquid hydrocarbons required to be added to reduce the equivalent carbon number $EACN_2'$ of the degassed oil to the equivalent carbon number $EACN_1'$ through a linear mixing as follows:

$$[n_1/(n_1+n_2)] \times EACN_2' + [n_2/(n_1+n_2)] \times EACN_{hydrocarbon} = EACN_1' \quad (5)$$

wherein $n_1$ is an amount of substance corresponding to the degassed oil, $n_2$ is an amount of substance corresponding to the liquid hydrocarbons required to be added, $EACN_{hydrocarbon}$ is an effective carbon number of a hydrocarbon, and the amount of the liquid hydrocarbons required to be added is calculated according to Formula (5);

(5) adding a calculated amount of the liquid hydrocarbons into the degassed oil and stirring the liquid hydrocarbons and the degassed oil until the liquid hydrocarbons and the degassed oil are fully mixed to obtain a compound degassed oil, wherein a salinity $S_2^{*''}$ of the compound degassed oil added with the liquid hydrocarbons is measured again by a salinity scanning, and $EACN_2''$ according to the salinity $S_2^{*''}$ of the compound degassed oil is calculated by Formula (4);

(6) when the $EACN_2''$ of the compound degassed oil is consistent with the equivalent carbon number $EACN_1'$ of the live oil, obtaining the representative degassed oil with the equivalent minimum miscible pressure;

when the $EACN_2''$ of the compound degassed oil is greater than the equivalent carbon number $EACN_1'$ of the live oil, adding the liquid hydrocarbons for an adjustment with a step length of 1% of a degassed oil volume until the representative degassed oil with the equivalent minimum miscible pressure is obtained; and when the $EACN_2''$ of the compound degassed oil is smaller than the equivalent carbon number $EACN_1'$ of the live oil, adding the degassed oil for the adjustment with the step length of 1% of the degassed oil volume until the representative degassed oil with the equivalent minimum miscible pressure is obtained.

2. The preparation method of the representative degassed oil with the equivalent minimum miscible pressure according to claim 1, wherein the surfactant is Sodium Fatty Alcohol Polyoxypropylene Polyoxyethylene Sulfate, Sodium Fatty Alcohol Polyoxyethylene Sulfate, or Sodium Fatty Alcohol Polyoxypropylene Sulfate.

3. The preparation method of the representative degassed oil with the equivalent minimum miscible pressure according to claim 1, wherein the liquid hydrocarbons are pentane, hexane, heptane, or a corresponding homologue.

* * * * *